(12) United States Patent
Campo et al.

(10) Patent No.: US 8,185,428 B1
(45) Date of Patent: May 22, 2012

(54) METHOD AND APPARATUS FOR PREDICTING PROJECT COST PERFORMANCE

(75) Inventors: Michael J. Campo, Stow, MA (US); Neal A. Mackertich, Hopkinton, MA (US); Robert J. Floyd, Londonderry, NH (US); Rachel E. Beitz, Lowell, MA (US); Peter D. Kraus, Tyngsboro, MA (US)

(73) Assignee: Raytheon Company, Waltham, MA (US)

( * ) Notice: Subject to any disclaimer, the term of this patent is extended or adjusted under 35 U.S.C. 154(b) by 429 days.

(21) Appl. No.: 12/502,706

(22) Filed: Jul. 14, 2009

(51) Int. Cl.
*G06Q 10/00* (2012.01)

(52) U.S. Cl. .................. 705/7.25; 705/7.28; 705/7.38

(58) Field of Classification Search ............... 705/7.23, 705/7.25, 7.38
See application file for complete search history.

(56) References Cited

U.S. PATENT DOCUMENTS

| | | | | |
|---|---|---|---|---|
| 5,233,513 A * | 8/1993 | Doyle | ........................ | 705/7.11 |
| 7,092,895 B2 * | 8/2006 | Chappel et al. | .............. | 705/7.38 |
| 7,216,088 B1 * | 5/2007 | Chappel et al. | .............. | 705/7.17 |
| 7,313,531 B2 * | 12/2007 | Chappel et al. | .............. | 705/7.17 |
| 7,318,038 B2 * | 1/2008 | Labbi | ........................ | 705/7.23 |
| 7,526,494 B2 * | 4/2009 | Rom et al. | ............. | 1/1 |
| 7,559,049 B1 * | 7/2009 | Hemmat et al. | .............. | 717/102 |
| 7,599,849 B2 * | 10/2009 | Mathews et al. | .............. | 705/7.37 |
| 7,617,117 B2 * | 11/2009 | Starkey | ........................ | 705/7.22 |
| 7,729,933 B2 * | 6/2010 | Ye et al. | ........................ | 705/7.11 |
| 7,822,621 B1 * | 10/2010 | Chappel | ........................ | 705/2 |
| 7,844,480 B2 * | 11/2010 | Ricketts | ........................ | 705/7.23 |
| 7,937,281 B2 * | 5/2011 | Miller et al. | .................. | 705/7.11 |
| 7,971,181 B2 * | 6/2011 | Pabalate et al. | .............. | 717/104 |
| 2003/0033191 A1 * | 2/2003 | Davies et al. | .............. | 705/10 |
| 2004/0059627 A1 * | 3/2004 | Baseman et al. | .............. | 705/10 |
| 2004/0243968 A1 * | 12/2004 | Hecksel | ........................ | 717/100 |
| 2005/0216879 A1 * | 9/2005 | Ruhe | ........................ | 717/101 |
| 2007/0162316 A1 * | 7/2007 | Kratschmer et al. | .............. | 705/8 |

OTHER PUBLICATIONS

"A study of the impact of requirements volatility on software project performance", D Zowghi . . . —Software Engineering Conference, . . . , 2002—ieeexplore.ieee.org.*

"Efficient Monte Carlo methods for conditional logistic regression" [PDF] from psu.edu CR Mehta, NR Patel . . . —Journal of the American Statistical . . . , 2000—JSTOR.*

Analysis of requirements volatility during software development life cycle[PDF] from uts.edu.au N Nurmuliani, D Zowghi . . . —. . . , 2004. Proceedings. 2004 . . . , 2004—ieeexplore.ieee.org.*

A detailed cost model for concurrent use with hardware/software co-design[PDF] from psu.edu D Ragan, P Sandborn . . . —. . . of the 39th annual Design . . . , 2002—portal.acm.org.*

[PDF] Performance results of CMMI-based process improvement[PDF] from psu.eduDL Gibson, DR Goldenson . . . —Software Engineering Process . . . , 2006—Citeseer.*

PDF] Requirements volatility and its impact on change effort: Evidence-based research in software development projects[PDF] from unisa.edu.au N Nurmuliani, D Zowghi . . . —Proceedings of the . . . , 2006—awre2006.cis.unisa.edu.au.*

[PDF] A Longitudinal Study of Requirements Volatility in Software Development[PDF] from qesp.org.au D Zowghi—the ASMA/SQA Meeting, 2005—qesp.org.au.*

(Continued)

*Primary Examiner* — Jonathan G Sterrett

(74) *Attorney, Agent, or Firm* — Lando & Anastasi, LLP

(57) ABSTRACT

A computer implemented method and model to perform project scenario simulations to facilitate understanding the risks associated with various factors such as, for example, project schedules and volatility in the design requirements/specifications. In one example, the model includes a statistical definition of a relationship between the cost performance index for the model and project parameters, such as requirements volatility and lifecycle overlap.

20 Claims, 8 Drawing Sheets

OTHER PUBLICATIONS http://en.wikipedia.org/wiki/Binomial_distribution—retrieved from the web on Nov. 11, 2011.* http://en.wikipedia.org/wiki/Logistic_regression -retrieved from the web on Nov. 11, 2011.*

"Logistic Regression",Gerard E. Dallal, Ph.D. retrieved from http://www.jerrydallal.com/LHSP/logistic.htm, Copyright © 2001 Gerard E. Dallal Last modified: Jul. 15, 2008 19:54:35.*

"Introduction to Regression" retrieved from the web at: http://dss.princeton.edu/online_help/analysis/regression_intro.htm, © 2007 The Trustees of Princeton University. All rights reserved.*

Koning, Alex J. and Franses, Philip Hans, Confidence Intervals for Cronbach's Coefficient Alpha Values (Jun. 18, 2003). ERIM Report Series Reference No. ERS-2003-041-MKT. Available at SSRN: http://ssrn.com/abstract=423658.*

* cited by examiner

| | A | B | |
|---|---|---|---|
| 1 | | | |
| 2 | % SW/HW Detail Design Complete at Requirements Release | | |
| 3 | | | |
| 4 | % Design Complete at Requirements Release | 50 | ←610 |
| 5 | | | |
| 6 | Range (+/-%) | 10 | ←630 |
| 7 | | | |
| 8 | | | |
| 9 | Requirements Volatility | | |
| 10 | | | |
| 11 | Requirements Volatility Estimate (%) | 50 | ←620 |
| 12 | | | |
| 13 | | | |
| 14 | Predicted SW/HW CPI | | |
| 15 | | | |
| 16 | Mean | 0.815 | |
| 17 | Standard Deviation | 0.017 | ⎫ |
| 18 | 95% Confidence Interval Lower Limit | 0.782 | ⎬ 640 |
| 19 | 95% Confidence Interval Upper Limit | 0.846 | ⎭ |

US 8,185,428 B1

METHOD AND APPARATUS FOR PREDICTING PROJECT COST PERFORMANCE

BACKGROUND

1. Field of the Invention

The present invention is directed to systems and methods for predicting outcomes based on variable factors and, more particularly, for predicting and analyzing cost performance of a project.

2. Discussion of Related Art

Engineering design projects and programs are governed by design requirements, which specify various parameters of the design, e.g., performance specifications, size, power consumption/generation, etc. Volatility in the design requirements, as well as aggressive schedules for project deliverables that require hardware and/or software design to begin before the design requirements are complete frequently negatively impact the cost of the project. Although the impact has been experienced in numerous projects in different fields, there has been no way to quantify the risk to cost performance associated with these factors.

SUMMARY OF INVENTION

Aspects and embodiments are directed to a computer-implemented method and apparatus for predicting the risks associated with various factors such as, for example, project schedules and volatility in the design requirements/specifications, and for building a model to run simulations to provide risk predictions. Embodiments of the model discussed herein may use actual or predicted (estimated) measures of requirements volatility and actual or predicted measures of the percentage overlap between release of the requirements and the start of the project design work to predict hardware and/or software cost performance (e.g., CPI). Embodiments of the model may be calibrated using historical data, and use statistically determined relationships between the data, along with Monte Carlo simulations, to probabilistically predict CPI, as discussed further below. Using the predicted cost performance results, project leaders may quantify risk and prepare mitigation strategies based on requirements volatility and lifecycle overlap.

According to one embodiment, a computer implemented method of predicting a cost performance index for a project comprises accepting via a user interface of a computer system a first user input representative of a lifecycle overlap value for the project, accepting via the user interface a second user input representative of a requirements volatility value for the project, defining by the computer system probability distributions for each of the first and second user inputs, and based on the probability distributions, running on the computer system a plurality of simulations of an equation in order to generate a predicted cost performance index for the project, the equation defining a relationship between the lifecycle overlap value, the requirements volatility value and the cost performance index. In one example, running the plurality of simulations includes running on the computer system a plurality of Monte Carlo simulations of the equation. In another example, defining the probability distributions includes generating normal distributions for each of the first and second user inputs. The method may further comprise accepting via the user interface a third user input representative of a confidence range for the lifecycle overlap value. In one example, defining the probability distribution for the first user input includes defining the probability distribution based at least in part on the third user input. The method may further comprise displaying on a display component of the computer system the predicted cost performance index for the project.

In another embodiment, a computer implemented method of building a model for predicting a cost performance index for a project comprises analyzing by the computer system a data set comprising project data for a plurality of projects, the data set comprising, for each project of the plurality of projects, a first value representative of a first project characteristic, a second values representative of a second project characteristic, and a corresponding cost performance index value. The method further includes, based on analyzing the data set, defining by the computer system a relationship between the cost performance index value and the first and second values, and building on the computer system the model based on the relationship. The model is operable to receive a first input representative of the first project characteristic for the project and a second input representative of the second project characteristic for the project, and to generate a predicted cost performance index for the project based on the first and second inputs. In one example, the first project characteristic is lifecycle overlap and the second project characteristic is requirements volatility, and defining the relationship includes defining the relationship between the cost performance index value and the first and second values representative of lifecycle overlap and requirements volatility. Defining the relationship may further include performing by the computer system a fitting operation on the data set to determine an equation defining the relationship. In one example, performing the fitting operation includes using a least squares fit algorithm to determine a linear equation defining the relationship. In another example, building the model includes encoding on a computer readable medium a plurality of executable instructions that, when executed by a computer, instruct the computer to run a plurality of Monte Carlo simulations of the equation based on the first and second inputs. Encoding the plurality of executable instructions may further comprise encoding executable instructions that, when executed by the computer, instruct the computer to generate a first probability distribution from the first input, generate a second probability distribution from the second input, and run the plurality of Monte Carlo simulations of the equation based on the first probability distribution and the second probability distribution.

According to one aspect, computer-readable media having computer-readable signals stored thereon that define instructions that, as a result of being executed by a computer, instruct the computer to perform a method for predicting a cost performance index for a project, and/or for building a model to be used to predict cost performance index, are provided. The computer-readable media may include separate computer-readable media with signals stored thereon for performing each individual element of the methods described above, and/or computer-readable media for performing the method elements described above in combination.

For example, one embodiment is directed to a computer-readable medium having computer-readable signals stored thereon that define instructions that, as a result of being executed by a computer, instruct the computer to perform a method for predicting a cost performance index, the method comprising acts of accepting via a user interface of a computer system a first user input representative of a lifecycle overlap value for the project, accepting via the user interface a second user input representative of a requirements volatility value for the project, defining by the computer system probability distributions for each of the first and second user inputs, running on the computer system a plurality of simulations of an equation using the probability distributions, the equation defining a relationship between the lifecycle overlap value, the requirements volatility value, and the cost performance index and based on the simulations, generating a predicted cost performance index for the project.

According to another embodiment, a computer system comprises a processor, a user interface responsive to the processor and configured to accept input values from a user, and memory responsive to the processor, the memory including program instructions operable to direct the processor to: accept via the user interface a first user input representative of a lifecycle overlap value for a project, accept via the user interface a second user input representative of a requirements volatility value for the project, define probability distributions for each of the first and second user inputs, and using the probability distributions, run a plurality of simulations of an equation that defines a relationship between the lifecycle overlap value, the requirements volatility value, and cost performance index to generate a predicted cost performance index for the project. In one example, the plurality of simulations are Monte Carlo simulations. The computer system may further comprise a display component responsive to the processor and configured to display the predicted cost performance index. In one example, the memory further includes program instructions operable to direct the processor to accept via the user interface a third user input representative of a confidence range for the lifecycle overlap value, and define the probability distribution for the first user input using the third user input. In one example, the probability distributions are normal distributions. In another example, the equation defines a relationship between a product of the probability distributions and the predicted cost performance index. In yet another example, the equation has the form:

$$CPI = A*(x_1*x_2) + B;$$

wherein CPI is the predicted cost performance index for the project, $x_1$ is the probability distribution for the first user input, $x_2$ is the probability distribution for the second user input, and A and B are pre-defined constants.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

In the figures.

DETAILED DESCRIPTION

Figure 1:
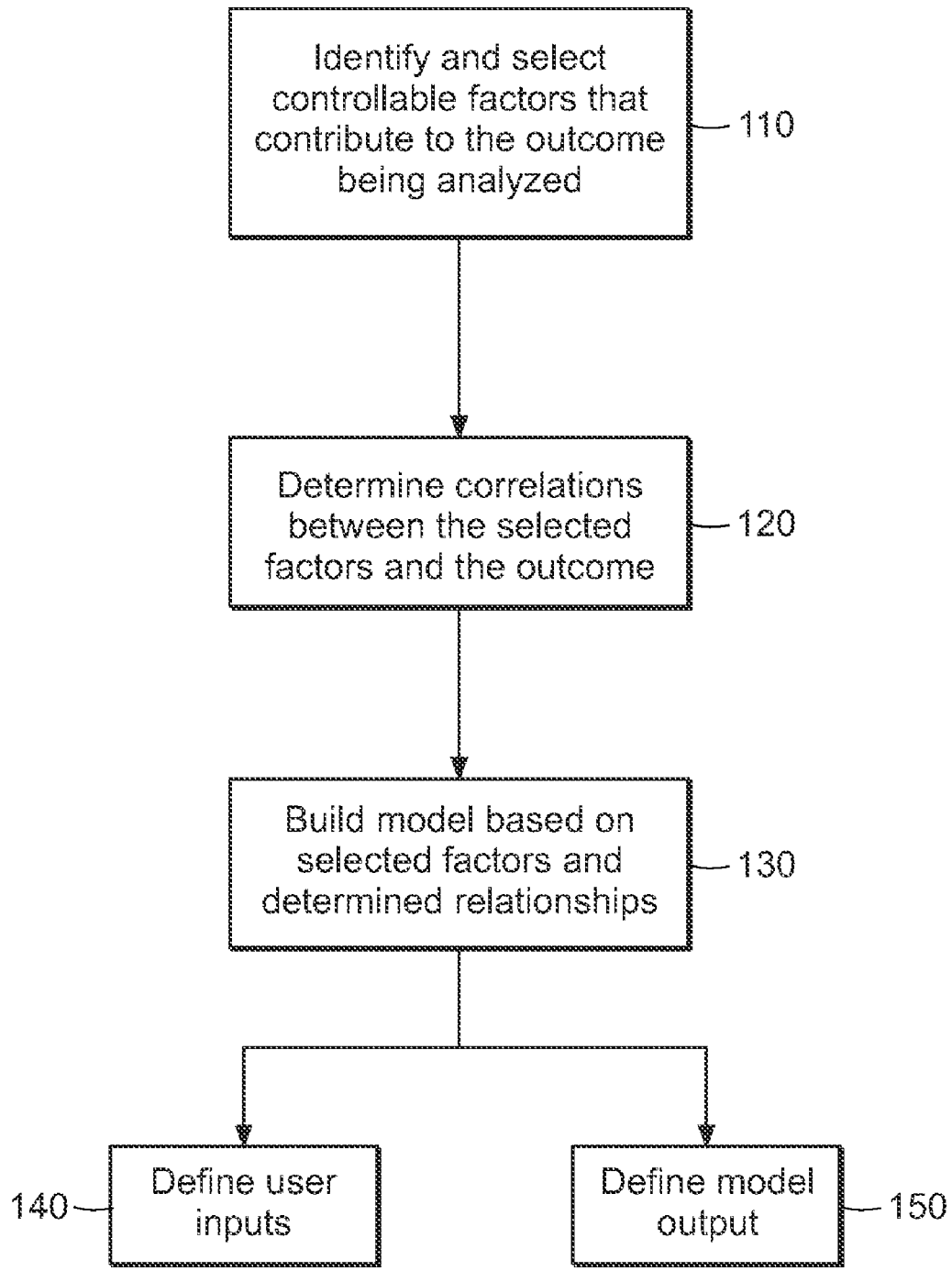
FIG. 1 is a flow chart illustrating one example of a method of developing a project analysis model, according to aspects of the invention.

Aspects and embodiments are directed to the use of a model to perform project scenario simulations to facilitate understanding the risks associated with various factors such as, for example, project schedules and volatility in the design requirements/specifications. In particular, aspects and embodiments are directed to using the model to predict project cost performance. Many projects, including those performed for the United States government, use a cost performance index (CPI) to measure the performance of a project (or stages thereof) against its set budget. A CPI of greater than 1.0 means that the project cost less than the budgeted amount, whereas a CPI of less than 1.0 means that the project has exceeded its budget. Accordingly, various aspects and embodiments are directed to providing an estimated CPI based on expected or actual measures of certain identified project factors; however, it is to be appreciated that measures of cost performance other than CPI may be used and provided.

According to one embodiment, a model may be used to estimate or predict the risks associated with proposed project schedules and potential requirements volatility during the planning phases of the project, enabling preparation of mitigation strategies before the risks are realized. In one embodiment, the model uses predicted or actual measures of the volatility of the design requirements for a project (i.e., the likelihood that the design requirements will change), referred to herein as "requirements volatility," in combination with predicted or actual measures of the overlap between the design requirements and design implementation to predict project cost performance, as discussed further below. The overlap between the requirements and the design refers to when the hardware and/or software project design work must begin relative to when the design requirements are complete, and is referred to herein as "lifecycle overlap." A high percentage lifecycle overlap would mean that the design phase and the requirements setting phase of the project occur, to a certain extent, simultaneously, whereas a low percentage lifecycle overlap would mean that the requirements are close to complete before significant design work begins. As discussed above, aggressive schedules for project deliverables often force the hardware and/or software design work to begin well before the requirements have been finalized. If there is significant volatility in the requirements (i.e., the requirements are subject to significant changes), as well as substantial overlap between the requirements and the design, there can be a substantial negative impact on the project cost, as much design work may need to be redone to cope with changing requirements.

Aspects and embodiments are directed toward methods and apparatus to predict the impact of requirements volatility and lifecycle overlap to quantify the associated risk to project cost, as discussed further below. A model according to various aspects and embodiments may further be used throughout, or at various stages of, the project lifecycle to monitor and determine cost performance of the project. This may allow better control and management of project costs, and may be also be used to support organizational innovation and deployment activities, as well as causal analysis and resolution activities.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to one embodiment, in order to be a useful tool for project cost management, an analysis model may relate the behavior or circumstance of a process or subprocess to an outcome of that process or subprocess. For example, the model may predict future outcomes based on possible or actual changes to factors affecting the process or subprocess, thereby supporting "what if" analyses. Data representative of factors from one or more subprocesses may be used to formulate the prediction. These factors may be preferably controllable such that action may be taken to influence the outcome. For example, the model may be used during project planning and/or tailoring to predict a project outcome (e.g., whether or not the project budget will be met) and, if the outcome is undesirable, action may be taken to change the factors so as to yield a better predicted outcome.

Therefore, referring to FIG. 1, developing a project analysis model may begin by identifying controllable factors that contribute to the outcome being analyzed, as illustrated in step 110. In identifying and selecting the factors, consideration may be given to early triggers that may provide warning of later problems, and to factors that are susceptible to process changes. In one embodiment, the model is used to predict project cost performance, for example, by predicting CPI. In this embodiment, the factors used in the model include requirements volatility and lifecycle overlap, both of which are at least partially controllable by project managers. The following discussion of various embodiments and aspects may refer primarily to a model used to predict CPI based on these two factors; however, those skilled in the art will recognize, given the benefit of this disclosure, that processes similar to those discussed herein may be used to develop and use a model that predicts outcomes other than CPI and/or uses factors other than requirements volatility and lifecycle overlap. Accordingly, the embodiments and examples discussed herein are exemplary only, and not intended to be limiting.

According to one embodiment, an analysis model includes a description of the relationships among attributes of a process and its work products. These relationships may be developed from historical process-performance data and calibrated using collected process and product measures from a project, as discussed further below. The relationships may be used to predict results to be achieved by following a particular process. Thus, in step 120, after the factors have been identified, correlations between the factors and the outcome may be determined. As discussed further below, embodiments of the model are statistical or probabilistic in nature, rather than deterministic, and may therefore, depict uncertainty in the factors and predict the uncertainty in, or range of values for, the outcome. Thus, in one example, step 120 includes determining statistical relationships between the factors and the outcome. These relationships may then be used to build the model (step 130).

Still referring to FIG. 1, building the model may also include defining user-provided inputs (step 140) that are representative of the identified factors and defining the output that the model will generate (step 150). In one embodiment, the model uses statistically determined relationships between predicted or actual requirements volatility and predicted or actual percentage lifecycle overlap to probabilistically predict CPI. Thus, the user inputs to the model may include representations of the requirements volatility and lifecycle overlap, as discussed further below. The predicted CPI values (the output) may be used to quantify risk and prepare mitigation strategies based on requirements volatility and lifecycle overlap.

Various aspects and functions discussed herein may be implemented as hardware or software on one or more computer systems. There are many examples of computer systems currently in use. Some examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Additionally, aspects and embodiments may be located on and/or implemented by a single computer system or may be distributed among a plurality of computer systems connected to one or more communication networks.

Figure 2:
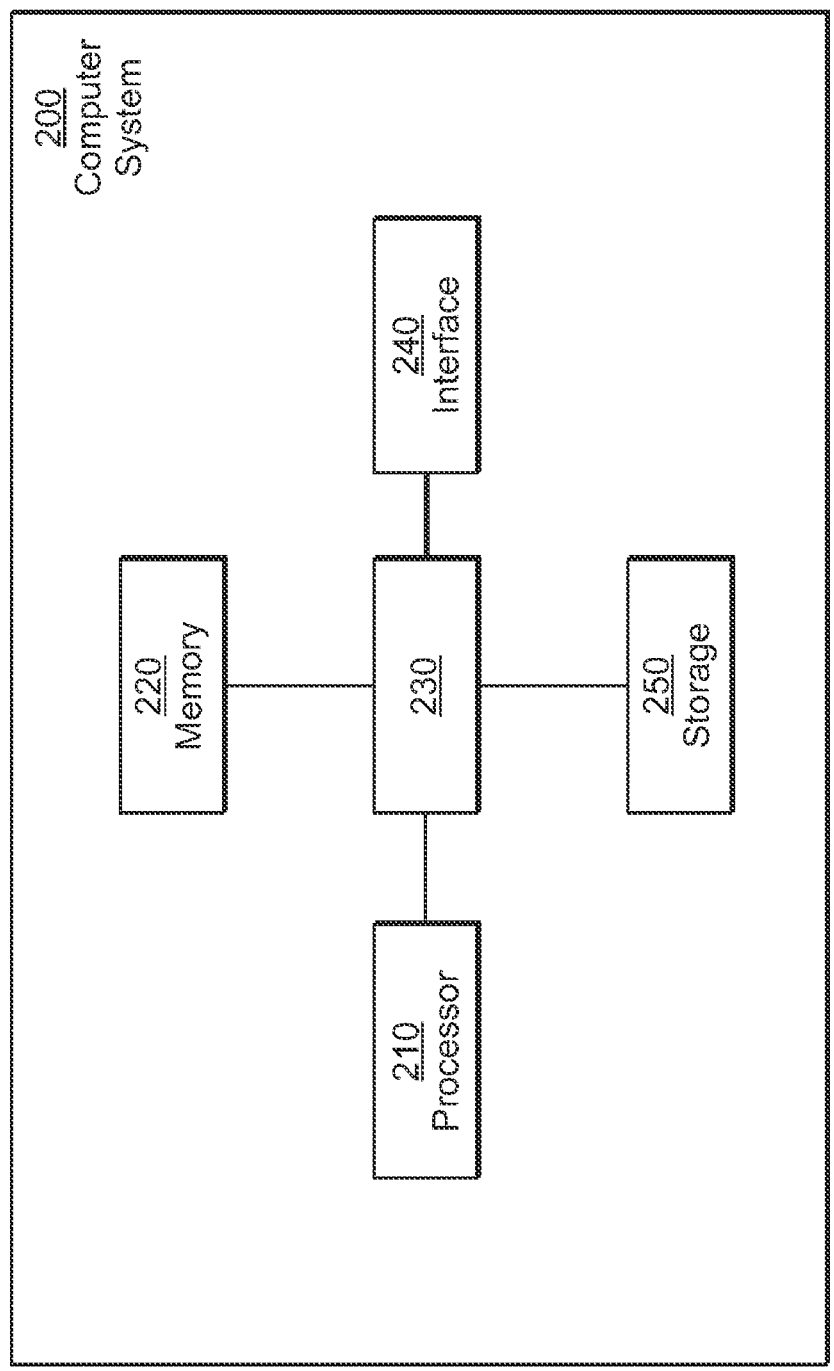
FIG. 2 is a block diagram of one example of a general purpose computer system.

For example, various aspects may be implemented as specialized software executing in one or more computer systems. In one example, the model is implemented as a software program, or as module or macro that runs within another existing software program (e.g., a macro for Microsoft's EXCEL), as discussed further below. FIG. 2 illustrates a block diagram of a general purpose computer system 200 in which various aspects of the present invention may be practiced. As depicted in FIG. 2, the computer system 200 includes a processor 210, a memory 220, an interconnection mechanism 230, which may include one or more busses (e.g., between components that are integrated within a same machine) and/or a network (e.g., between components that reside on separate discrete machines), an interface 240 and a storage system 250. The processor 210, which may include one or more microprocessors or other types of controllers, can perform a series of instructions that result in manipulated data. The processor 210 may be a commercially available processor such as an Intel PENTIUM, Motorola PowerPC, SGI MIPS, Sun UltraSPARC, or Hewlett-Packard PA-RISC processor, but may be any type of processor or controller as many other processors and controllers are available. As shown, the processor 210 is connected to other system elements, including a memory 220, by the interconnection mechanism 230.

The memory 220 may be used for storing programs and data during operation of the computer system 200. Thus, the memory 220 may be a relatively high performance, volatile, random access memory such as a dynamic random access memory (DRAM) or static memory (SRAM). However, the memory 220 may include any device for storing data, such as a disk drive or other non-volatile storage device. Various embodiments in accord with the present invention can organize the memory 220 into particularized and, in some cases, unique structures to perform the aspects and functions disclosed herein.

Components of the computer system 200 may be coupled by an interconnection element 230. The interconnection mechanism 230 enables communications (e.g., data, instructions) to be exchanged between system components of the computer system 200. The interconnection mechanism 230 may include one or more physical busses (for example, busses between components that are integrated within a same machine), or may include any communication coupling between system elements including specialized or standard computing bus technologies such as IDE, SCSI, PCI and InfiniBand.

Still referring to FIG. 2, the computer system 200 also includes one or more interface devices 240 such as input devices, output devices and combination input/output devices. The interface devices 240 may receive input or provide output. More particularly, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 240 allow the computer system 200 to exchange information and communicate with external entities, such as users and other systems.

The storage system 250 may include a computer readable and writeable nonvolatile storage medium in which instructions are stored that define a program to be executed by the processor. The storage system 250 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor 210 or some other controller may cause data to be read from the nonvolatile recording medium into another memory, such as the memory 220, that allows for faster access to the information by the processor than does the storage medium included in the storage system 250. The memory may be located in the storage system 250 or in the memory 220. The processor 210 may manipulate the data within the memory 220, and then copy the data to the medium associated with the storage system 250 after processing is completed. A variety of components may manage data movement between the medium and integrated circuit memory element and the invention is not limited thereto. Further, the invention is not limited to a particular memory system or storage system.

Although the computer system 200 is shown by way of example as one type of computer system upon which various aspects and functions may be practiced, aspects of the invention are not limited to being implemented on the computer system as shown in FIG. 2. Various aspects and functions in accord with the present invention may be practiced on one or more computers having a different architectures or components than that shown in FIG. 2. For example, the computer system 200 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Figure 3:
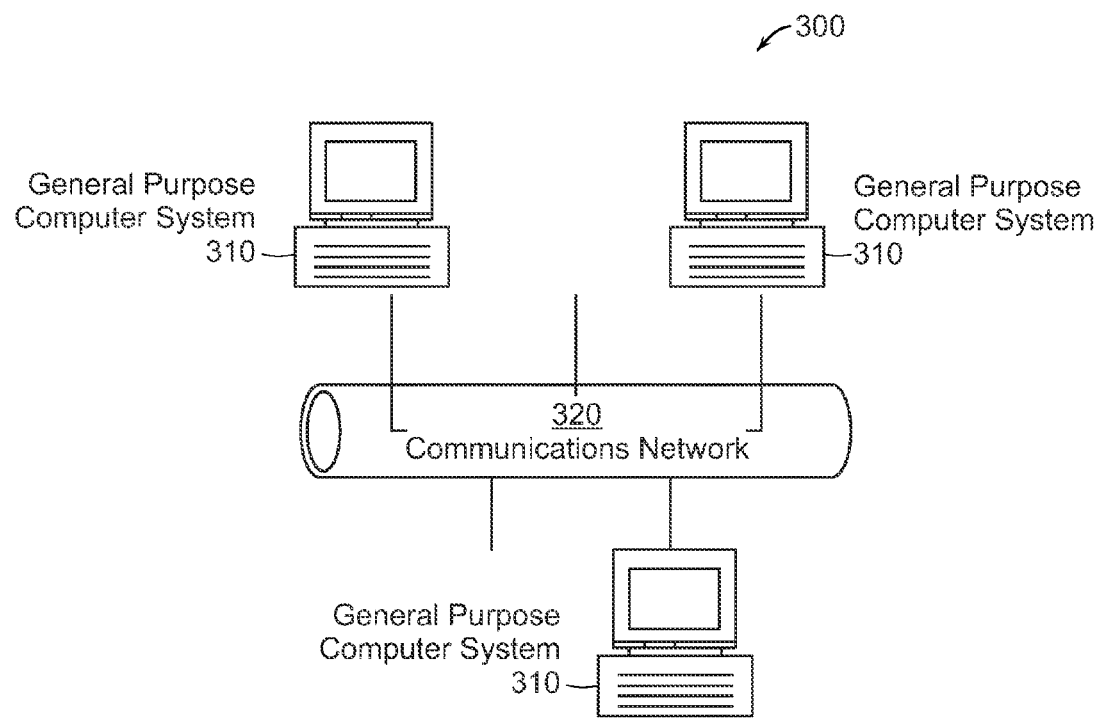
FIG. 3 is a block diagram of one example of a distributed computer system.

For example, various aspects and functions may be distributed among one or more computer systems configured to provide a service to one or more client computers, or to perform an overall task as part of a distributed system. An example of a distributed system 300 in which various aspects and functions in accord with the present invention may be practiced is shown in FIG. 3. The distributed computer system 300 includes a plurality of general purpose computer systems 310 communicating over a network 320. Any of the general purpose computer systems 310 may be the general purpose computer system 200, or a similar system. The network 320 may include any communication network through which computer systems may exchange data. To exchange data via the network 320, the computer systems 310 and the network 320 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services. To ensure data transfer is secure, the computer systems 310 may transmit data via the network 320 using a variety of security measures including TSL, SSL or VPN, among other security techniques. While the distributed computer system 300 illustrates three networked computer systems 310, the distributed computer system 300 may include any number of computer systems, networked using any medium and communication protocol.

Figure 4:
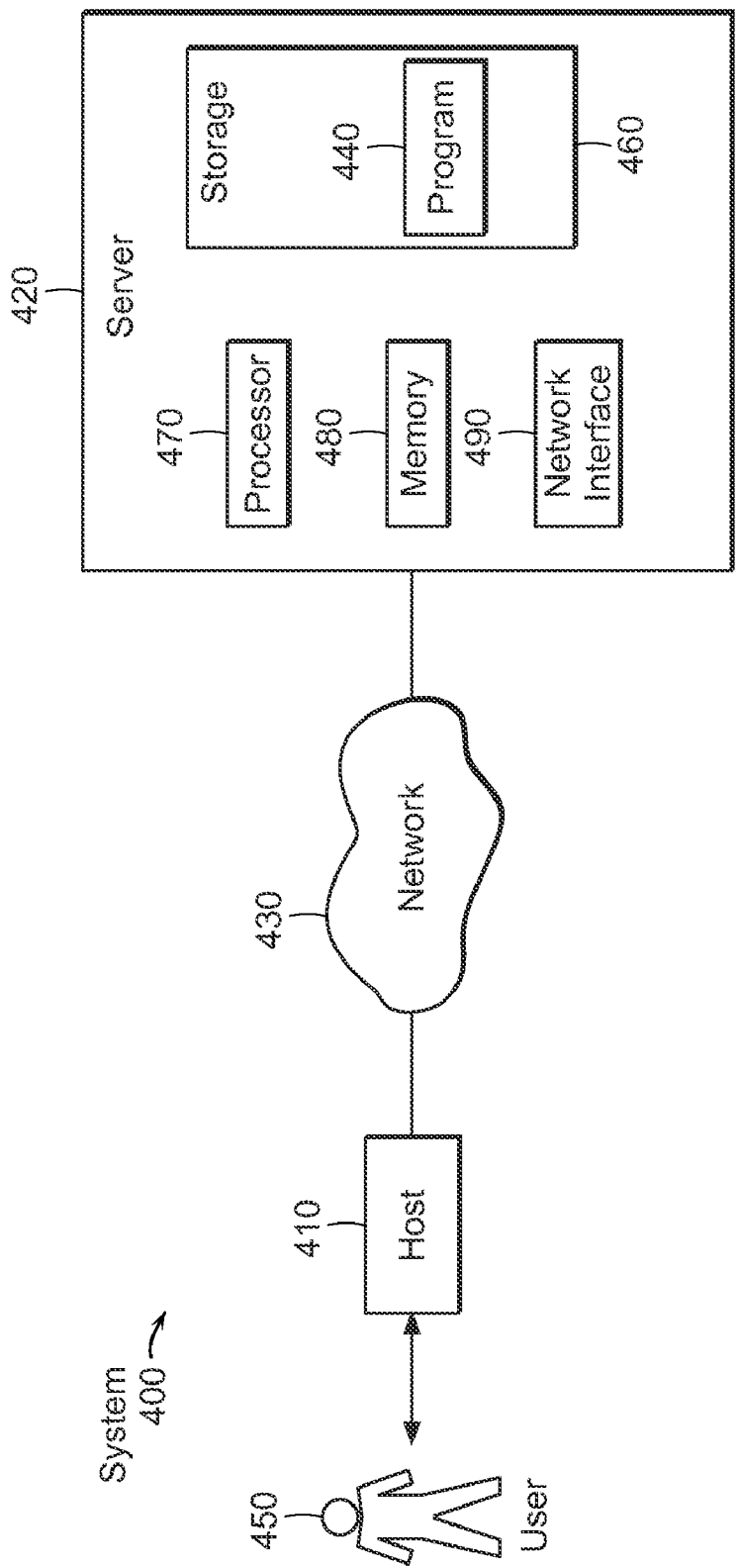
FIG. 4 is a block diagram of one example of a client-server computer system.

Additionally, aspects may be performed on a client-server or multi-tier system that includes components distributed among one or more server systems that perform various functions. These components may be executable, intermediate (e.g., IL) or interpreted (e.g., Java) code which communicate over a communication network (e.g., the Internet) using a communication protocol (e.g., TCP/IP). For example, referring to FIG. 4, there is illustrated a block diagram of one example of a system 400 in which a host computer system 410 is coupled to a server 420 via a network 430. The network may be, for example, the Internet. The host 410 may be any type of computer system, including a general purpose computer or specially programmed computer system, as discussed above. The server 420 may provide a program 440 that is executed by the host 410 for running the model, as discussed further below. A user 450 may access the model via an interface of the host 410. The program 440 may be stored for example, in a computer-readable medium 460 (e.g., a memory, storage, or other media) associated with server 420. For example, the program 440 may be stored on a web server and downloaded to the host 410 over the Internet.

Server 420 may also be a general-purpose computer system, or any other type of computer system capable of interfacing with the host 410. Server 420 generally includes a processor 470 for executing server-based program functions, and a memory 480 for storing data associated with the program 440. Server 420 may also include one or more network interfaces 490 that couple server 420 to network 430, which permit server 420 to communicate with one or more hosts 410.

It should be appreciated that the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular single or distributed architecture, network, or communication protocol.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

Referring again to FIG. 2, the computer system 200 may include an operating system that manages at least a portion of the hardware elements included in computer system 200. A processor or controller, such as processor 210, may execute an operating system which may be, among others, a Windows-based operating system (for example, Windows NT, Windows 2000 (Windows ME), Windows XP, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various aspects and functions in accord with the present invention may be implemented in a non-programmed environment (for example, documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

As discussed above, in embodiment, the model can be built as a module or macro that runs within an existing software program, such as, for example, Microsoft's EXCEL spreadsheet program. It is to be appreciated that although the examples discussed below include a model implemented in EXCEL, the invention is not so limited, and those skilled in the art will recognize, given the benefit of this disclosure, that embodiments of the model may be built using a variety of different software programs.

Referring again to FIG. 1, a first step 110 in creating the analysis model may include identifying and selecting the factors that are going to be used in the model to predict the selected outcome. As discussed above, in one embodiment, the output of the model is a prediction of CPI for the project (or sub-project) and the two factors are requirements volatility and lifecycle overlap. Once the factors have been identified and selected, the relationships between the factors and outcome are determined (step 120) and may used to build an algorithm that defines the output, e.g., CPI, as a function of the factors. Thus, when estimates of the factors, e.g., estimates of requirements volatility and lifecycle overlap, are entered as the user inputs into the model, the algorithm generates a prediction of CPI.

According to one embodiment, the algorithm is built based on historical data gathered from past projects. The historical data, which may includes recorded information about the requirements volatility and lifecycle overlap for past projects, as well as the actual CPI for each of those past projects, can be used to define mathematical relations between requirements volatility, lifecycle overlap and CPI. For example, Table 1 below shows some example historical data for 26 projects. The data includes, for each project, the percentage (normalized to 100) that each design was completed at the time the requirements were released (column 2), the percentage (also normalized to 100) volatility of the requirements (column 3), which is a measure of how volatile or subject to change the requirements were (e.g., a low volatility might be about 15% or less, whereas a high volatility might be about 70% or more), and the CPI (column 5).

TABLE 1

| Project | % Design Complete | Volatility | % Design Complete * Volatility | CPI |
|---|---|---|---|---|
| 1 | 1 | 0.297 | 0.297 | 0.88 |
| 2 | 1 | 0.297 | 0.297 | 0.82 |
| 3 | 1 | 0.297 | 0.297 | 0.89 |
| 4 | 1 | 0.297 | 0.297 | 0.82 |
| 5 | 0.38 | 0.297 | 0.113 | 0.94 |
| 6 | 0.6 | 0.297 | 0.178 | 0.96 |
| 7 | 0.92 | 0.532 | 0.489 | 0.77 |
| 8 | 0.78 | 0.532 | 0.415 | 0.62 |
| 9 | 0.65 | 0.532 | 0.346 | 0.63 |
| 10 | 0.77 | 0.532 | 0.410 | 0.53 |
| 11 | 0.69 | 0.532 | 0.367 | 0.65 |
| 12 | 0.77 | 0.532 | 0.410 | 0.8 |
| 13 | 0.86 | 0.532 | 0.458 | 0.63 |
| 14 | 0.39 | 0.375 | 0.146 | 1.03 |
| 15 | 0.29 | 0.375 | 0.109 | 0.97 |
| 16 | 0.89 | 0.292 | 0.260 | 0.88 |
| 17 | 0.18 | 0.292 | 0.053 | 1.03 |
| 18 | 0.09 | 0.153 | 0.014 | 1.18 |
| 19 | 0.56 | 0.153 | 0.086 | 0.89 |
| 20 | 0.1 | 0.153 | 0.015 | 0.9 |
| 21 | 0.09 | 0.153 | 0.014 | 0.96 |
| 22 | 0.07 | 0.153 | 0.011 | 0.96 |
| 23 | 0.15 | 0.153 | 0.023 | 0.96 |
| 24 | 0.84 | 0.153 | 0.129 | 0.89 |
| 25 | 0.21 | 0.153 | 0.032 | 1.18 |
| 26 | 0.75 | 0.153 | 0.115 | 0.89 |

In the example shown in Table 1, the data also includes, in column 4, the normalized percentage design completion (lifecycle overlap) multiplied by the normalized percentage volatility (requirements volatility). In one example, it was empirically determined that a relationship can be defined between CPI and the product of lifecycle overlap and requirements volatility. This relationship is illustrated in FIG. 5.

Figures 5, 6:
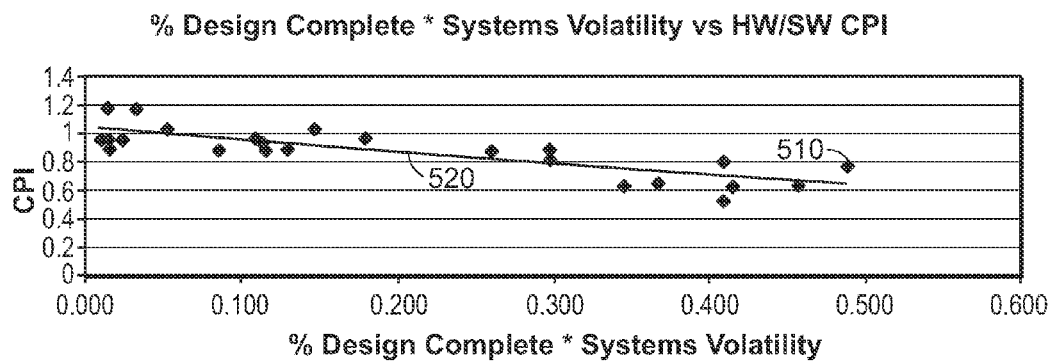
FIG. 5 is a graph illustrating a relationship between cost performance index (CPI) and the product of lifecycle overlap and requirements volatility, according to aspects of the invention.
FIG. 6 is an image of one example of a user interface to a model according to aspects of the invention.

Referring to FIG. 5, there is illustrated a plot of CPI (on the vertical axis) as a function of the product of lifecycle overlap and requirements volatility (on the horizontal axis). Each point 510 corresponds to one of the projects listed in Table 1. As illustrated by line 520, the graph of FIG. 5 shows CPI generally trending downward (i.e., the project is more likely to exceed its budget) with increasing lifecycle overlap and/or requirements volatility. Because CPI trends with the product of lifecycle overlap and requirements volatility, FIG. 5 illustrates that higher lifecycle overlap can be tolerated if the requirements volatility is low, or vice versa. In one example, line 520 can be defined by the following equation:

$$CPI = A(x_1 * x_2) + B \quad (1)$$

In equation (1), $x_1$ is the normalized percentage lifecycle overlap and $x_2$ is the normalized percentage requirements volatility, with A and B being constants. In one example, A and B can be determined by fitting line 520 to the data points 510, for example, by using a least squares fit or other fitting algorithm. For the data shown in Table 1, in one example, A and B were determined such that equation (1) becomes:

$$CPI = -0.8275(x_1 * x_2) + 1.0427 \quad (2)$$

It is to be appreciated that the values for A and B given in equation (2) are specific to the data shown in Table 1, and for other data, different values of A and B may be determined. In addition, the values of A and B may vary, even for the same data set, depending on the fitting algorithm used and the degree of accuracy of the data and/or the fitting algorithm.

According to one embodiment, the model is built using equation (1), or in some specific examples, equation (2), with user-inputted values representative of lifecycle overlap and requirements volatility being normalized or otherwise converted to provide $x_1$ and $x_2$, as discussed further below. As discussed above, in one embodiment, the model is implemented using Microsoft's EXCEL program. Accordingly, referring to FIG. 6, there is illustrated a screen shot of an EXCEL page that provides a user interface to the model. In the illustrated example, cells 610 and 620 receive the user-inputted estimates of lifecycle overlap and requirements volatility. In one example, a user enters into cell 610 an estimated percentage (from 0 to 100) of the completeness of the design at the time of release of the design requirements. This entry is representative of lifecycle overlap. In cell 620, the user may enter an estimated, in percentage from 0 to 100, of the requirements volatility. In the illustrated example, the model accepts a third user input in cell 630, namely, an "error range" for the estimate of lifecycle overlap, which represents the "confidence" in the estimated lifecycle overlap. For example, a user may estimate a 50% lifecycle overlap (entered into cell 610) with an estimated 10% range or variability (entered into cell 630). This range estimate, or confidence value, may be used to generate a distribution to replace the single value $x_1$ in equation (1), as discussed further below. In one example, the outputs generated by running the model responsive to the user inputs are displayed in cell block 640, as also discussed further below.

Figure 7:
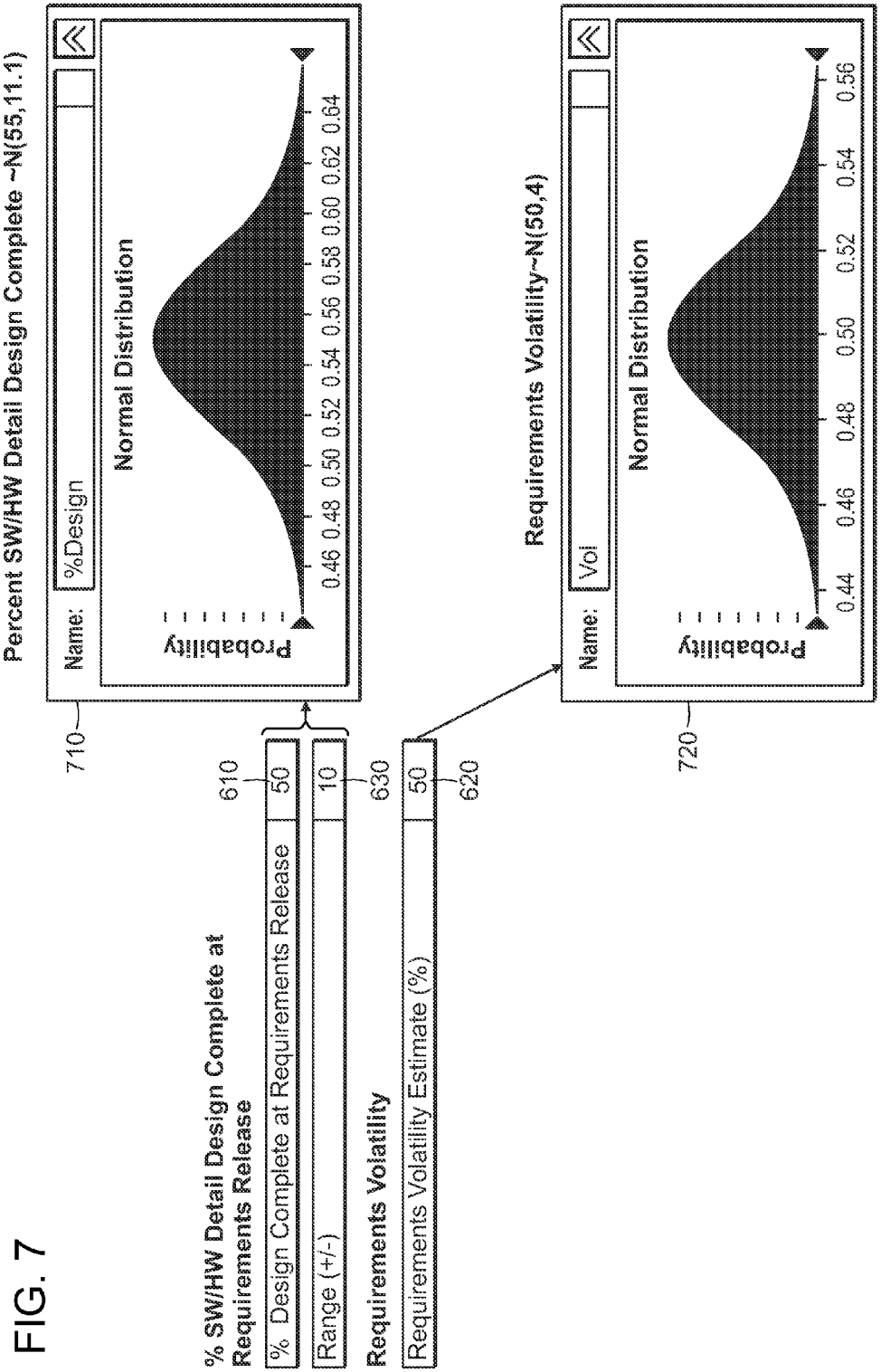
FIG. 7 is an image illustrating example normal (Gaussian) probability distributions for user inputs, according to aspects of the invention.

According to one embodiment, the model is statistical or probabilistic in nature, rather than deterministic, to account for uncertainty in the estimated values of lifecycle overlap and requirements volatility, and to predict the uncertainty in, or range of values for, the resulting CPI. Therefore, in one example, the values $x_1$ and $x_2$ is equation (1) represent probability distributions, rather than single values. In one example, these probability distributions are normal (or Gaussian) distributions, as illustrated in FIG. 7. In the example illustrated in FIG. 7, the user-inputted estimates for lifecycle overlap and confidence in the estimated lifecycle overlap (in cells 610 and 630, respectively), are used to generate a normal distribution 710 to be used for $x_1$, and the user-inputted estimate for requirements volatility (in cell 620) is used to generate a normal distribution 720 to be used for $x_2$. In the illustrated example, normal distribution 720 uses a standard deviation of 2 along with the user-inputted estimate of 50% for requirements volatility; however, it is to be appreciated that these values are examples only and that the value of the standard deviation may vary depending, for example, on statistical information available for the historical data used to define equation (1) and to build the model. In addition, it is to be appreciated that $x_1$ and $x_2$ are not limited to normal distributions and other types of distributions may be used, depending, for example, on known statistical or other information about lifecycle overlap and/or requirements volatility.

In one embodiment, the model is constructed to run a Monte Carlo simulation of equation (1), using the probability distributions for $x_1$ and $x_2$, to generate a probability distribution for the CPI. For example, the model may be constructed to sample the distributions of $x_1$ and $x_2$ and solve equation (1) for each pair of samples, many times over, for example, thousands of times, thereby generating a probability distribution corresponding to predicted CPI based on the user-inputted estimates of lifecycle overlap, confidence in the estimated overlap, and requirements volatility.

Figure 8:
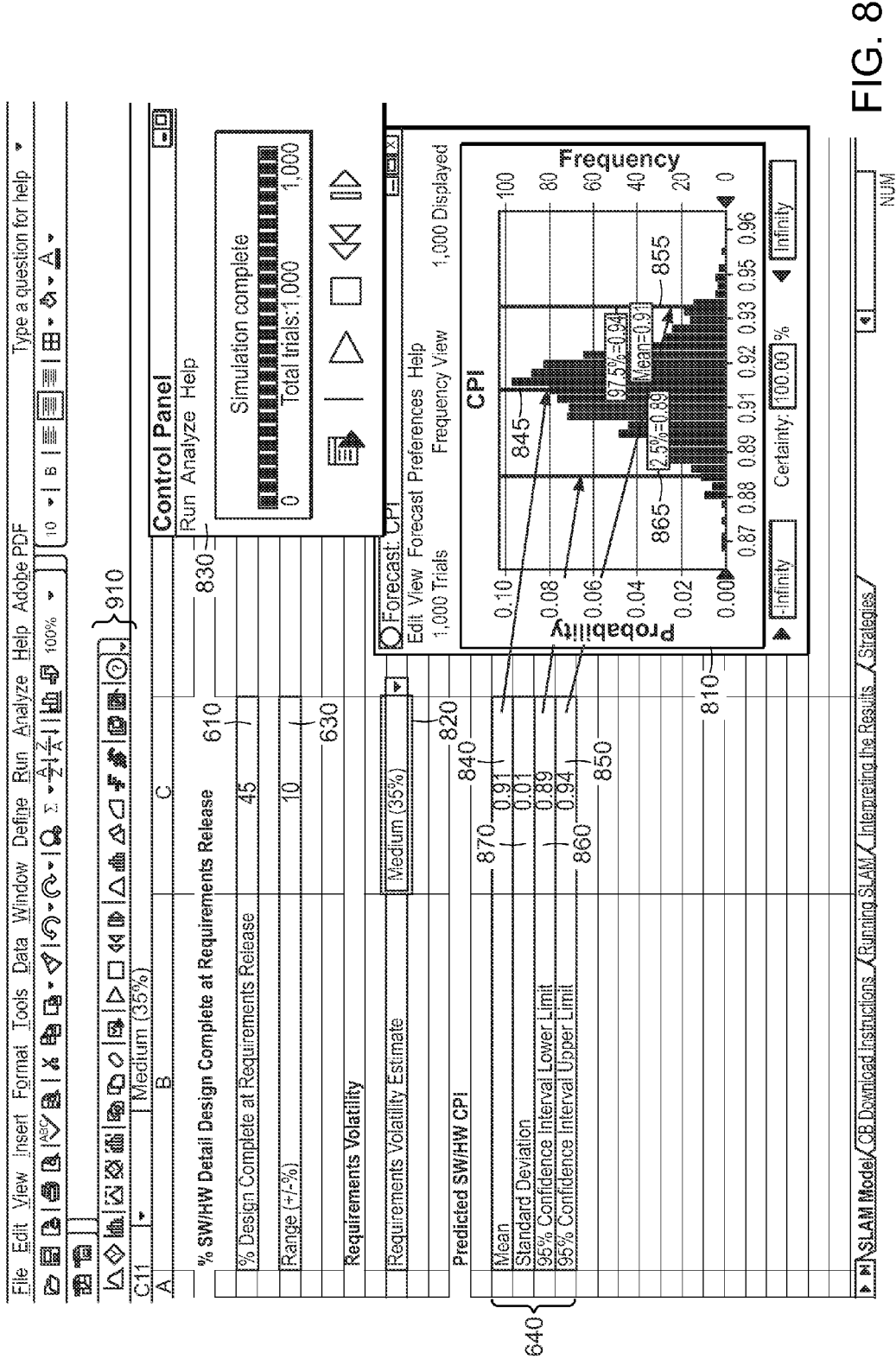
FIG. 8 is a screen shot of one example of an EXCEL user interface for an embodiment of a cost performance prediction model according to aspects of the invention.

Referring to FIG. 8, there is illustrated a screen shot of one example of an EXCEL user interface for an embodiment of the model showing a graph 810 of a predicted CPI distribution for an example project. In the example illustrated in FIG. 8, a user entered a lifecycle overlap estimate of 45% (in cell 610), and a confidence estimate of +−10% (in cell 630). In one example, cells 610 and 630 are "free" cells in which the user can type any number, as shown in FIGS. 6 and 8. In another example, one or more of the user-input cells may be configured to have a "pull-down" menu, as shown at cell 820. Thus, rather than type in the value, the user may select one of a certain number of pre-defined values from the pull-down menu. For example, in FIG. 8, the user has selected a value of 35% for the requirements volatility in cell 820. In the example illustrated in FIG. 8, cells 610 and 630 are "free" cells in which the user types estimates for lifecycle overlap and confidence in the overlap, and the requirements volatility estimate is selected from a pull-down menu (cell 820); however, it is to be appreciated that the model interface is not limited to the example shown in FIG. 8 and that any or all of the user input cells may be "free" cells or may use drop-down menus, or any other input format.

Figure 9:
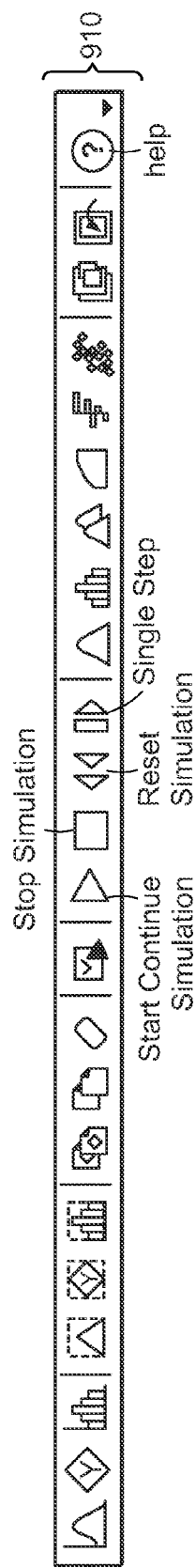
FIG. 9 is an image of one example of a toolbar for controlling an embodiment of a cost performance model according to aspects of the invention.

In one example, a "control panel" 830 may indicate to the user that the model is running the simulation and when the simulation is complete. In the example illustrated in FIG. 8, the control panel 830 includes control icons, such as "run," "stop," "pause" etc., to allow the user to control the simulation, and also displays the number of trials in the Monte Carlo simulation. In one example, each trial corresponds to a solution of equation (1) based on a sample taken from each of the $x_1$ and $x_2$ distributions, as discussed above. The number of trials may be user-selectable or may be preset. Those skilled in the art will recognize, given the benefit of this disclosure, that the control panel 830 may have many different appearances and may offer a variety of different control functions. Accordingly, embodiments of the model user interface are not limited to the examples shown or discussed herein as many variations are contemplated. For example, the user interface may include a toolbar 910 as shown in FIGS. 8 and 9, which may include icons for a variety of control functions. The toolbar 910 may be used in conjunction with the control panel 830 or may replace some or all of the functionality of the control panel.

Thus, in one example, to run the simulation, a user may enter the three input values, by typing estimated values into the appropriate cells or selecting estimated values from pull-down menus associated with the appropriate cells, "reset" the simulation to clear any old analyses, if necessary, select the number of trials to be run (if available), and run the simulation, for example by clicking a "run" icon. When the simulation is complete, the model program may display the predicted CPI value, and/or CPI probability distribution. In the example illustrated in FIG. 8, the output of the model is displayed both in the graph 810 of the predicted CPI probability distribution function and as a set of values in cell block 640. As shown in FIG. 8, in one example the output includes the mean predicted CPI displayed on graph 810 (represented by line 845) and in cell 840 along with upper and lower 95% confidence limits. The upper and lower 95% confidence limits, shown in cells 850 and 860, respectively, and corresponding to lines 855 and 865, respectively, on graph 810, define a range of predicted CPI values with a probability of 95% that the CPI will fall within that range. In the example illustrated in FIG. 8, the mean CPI is 0.91 and there is a 95% probability that the CPI will be between 0.89 and 0.94. The output may also include the standard deviation, shown in cell 870.

Thus, by running the simulation, the model demonstrates to the user, for this example, that if the design is about 45% complete already when the requirements are released (i.e., significant design work is begun prior to release of the requirements) and the requirements are subject to a 35% volatility (i.e., fairly likely to change), the project is very likely to exceed its budget, since the predicted CPI is 0.91. Given this information, the user (or other individual who obtains the information from the user) may decide to attempt to mitigate the predicted budget problem in any of a number of ways, for example, by negotiating a better project schedule or a higher budget. Embodiments of the model may be used, for example, during the planning or re-planning stages of a project to manage the ability to achieve the cost performance goals for the project.

Table 2 below illustrates some additional examples of predicted CPI based on various input values, using the model based on equation (2) above. As illustrated by these examples, reducing lifecycle overlap may significantly improve CPI. In addition, actual data for a project corresponding to Example 1 included a CPI of 0.915, compared to the predicted value of 0.92, indicating that the model may provide an accurate prediction of CPI.

TABLE 2

| Parameter | Example 1 | Example 2 | Example 3 |
|---|---|---|---|
| Lifecycle overlap | 100% | 0% | 0 |
| Confidence estimate | ±5% | ±5% | ±15% |
| Requirements volatility | 15% | 27.7% | 27.7% |
| Predicted CPI | 0.92 | 1.04 | 1.04 |
| Standard deviation | 0.02 | 0.00 | 0.01 |
| 95% confidence range | 0.89-0.95 | 1.04-1.05 | 1.02-1.06 |

Thus, embodiments of the model discussed herein may use actual or predicted (estimated) measures of requirements volatility and actual or predicted measures of the percentage overlap between release of the requirements and the start of the project design work to predict hardware and/or software cost performance (e.g., CPI). As discussed above, embodiments of the model may be calibrated using historical data, and use statistically determined relationships between the data, along with Monte Carlo simulations, to probabilistically predict CPI. Using the predicted cost performance results, project leaders may quantify risk and prepare mitigation strategies based on requirements volatility and lifecycle overlap. In addition, embodiments of the model built in existing, familiar programs, such as EXCEL, for example, may be fast and provide easy-to-use user interfaces.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A computer implemented method of predicting a cost performance index for a project, the method comprising:
   accepting via a user interface of a computer system a first input representative of a lifecycle overlap value for the project;
   accepting via the user interface a second input representative of a requirements volatility value for the project;
   defining by the computer system probability distributions for each of the first and second inputs; and
   based on the probability distributions, running on the computer system a plurality of simulations of an equation in order to generate a predicted cost performance index for the project, the equation defining a relationship between the lifecycle overlap value, the requirements volatility value and the cost performance index and having the form:

$$CPI = A*(x_1*x_2)+B;$$

wherein CPI is the predicted cost performance index for the project;
$x_1$ is the probability distribution for the first input;
$x_2$ is the probability distribution for the second input; and
A and B are pre-determined constants.

2. The computer implemented method as claimed in claim 1, wherein running on the computer system the plurality of simulations includes running on the computer system a plurality of Monte Carlo simulations of the equation.

3. The computer implemented method as claimed in claim 1, wherein defining the probability distributions includes generating normal distributions for each of the first and second inputs.

4. The computer implemented method as claimed in claim 1, further comprising:
accepting via the user interface a third input representative of a confidence range for the lifecycle overlap value.

5. The computer implemented method as claimed in claim 4, wherein defining the probability distribution for the first input includes defining the probability distribution based at least in part on the third input.

6. The computer implemented method as claimed in claim 1, further comprising displaying on a display component of the computer system the predicted cost performance index for the project.

7. A computer implemented method of building a model for predicting a cost performance index for a project, the method comprising:
analyzing by the computer system a data set comprising project data for a plurality of projects, the data set comprising, for each project of the plurality of projects, a first value representative of lifecycle overlap of the project, a second value representative of requirements volatility of the project, and a corresponding cost performance index value;
based on analyzing the data set, defining by the computer system a relationship between the cost performance index value and the first and second values; and
building on the computer system the model based on the relationship, the model having the form CPI=A*$(x_1*x_2)$+B, wherein A and B are constants defined based on analyzing the data set, and the model being operable to receive a first input $x_1$ representative of the lifecycle overlap for the project and a second input $x_2$ representative of the requirements volatility for the project, and to generate a predicted cost performance index CPI for the project based on the first and second inputs.

8. The computer implemented method as claimed in claim 7, wherein defining the relationship includes performing by the computer system a fitting operation on the data set to determine an equation defining the relationship.

9. The computer implemented method as claimed in claim 8, wherein performing the fitting operation includes using a least squares fit algorithm to determine a linear equation defining the relationship.

10. The computer implemented method as claimed in claim 8, wherein building the model includes encoding on a computer readable medium a plurality of executable instructions that, when executed by a computer, instruct the computer to run a plurality of Monte Carlo simulations of the equation based on the first and second inputs.

11. The method as claimed in claim 10, wherein encoding the plurality of executable instructions further comprises encoding executable instructions that, when executed by the computer, instruct the computer to:
generate a first probability distribution from the first input;
generate a second probability distribution from the second input; and
run the plurality of Monte Carlo simulations of the equation based on the first probability distribution and the second probability distribution.

12. A computer system comprising:
a processor;
a user interface responsive to the processor and configured to accept input values from a user; and
memory responsive to the processor, the memory including program instructions operable to direct the processor to:
accept via the user interface a first input representative of a lifecycle overlap value for a project;
accept via the user interface a second input representative of a requirements volatility value for the project;
define probability distributions for each of the first and second inputs; and
using the probability distributions, run a plurality of simulations of an equation that defines a relationship between the product of the probability distributions representative of the lifecycle overlap value and the requirements volatility value and a predicted cost performance index to generate the predicted cost performance index for the project, the equation having the form:

$$CPI = A*(x_1*x_2)+B;$$

wherein CPI is the predicted cost performance index for the project;
$x_1$ is the probability distribution for the first input;
$x_2$ is the probability distribution for the second input; and
A and B are pre-determined constants.

13. The computer system as claimed in claim 12, wherein the plurality of simulations are Monte Carlo simulations.

14. The computer system as claimed in claim 12, further comprising:
a display component responsive to the processor and configured to display the predicted cost performance index.

15. The computer system as claimed in claim 12, wherein the memory further includes program instructions operable to direct the processor to:
accept via the user interface a third input representative of a confidence range for the lifecycle overlap value; and
define the probability distribution for the first user input using the third input.

16. The computer system as claimed in claim 12, wherein the probability distributions are normal distributions.

17. The method as claimed in claim 1, the method further comprising:
analyzing a data set comprising project data for a plurality of projects, the data set comprising, for each project of the plurality of projects, a project lifecycle overlap value, a project requirements volatility value, and a corresponding cost performance index value; and
determining A and B based on analyzing the data set.

18. The method as claimed in claim 1, wherein running on the computer system the plurality of simulations of the equation includes generating a probability distribution of the cost performance index for the project.

19. The computer system as claimed in claim 12, the memory including program instructions further operable to direct the processor to:
- analyze a data set comprising project data for a plurality of projects, the data set comprising, for each project of the plurality of projects, a project lifecycle overlap value, a project requirements volatility value, and a corresponding cost performance index value; and
- determining A and B based on analyzing the data set.

20. The computer system as claimed in claim 12, the memory including program instructions further operable to direct the processor to:
- run the plurality of simulations of the equation to generate a probability distribution of the cost performance index for the project.

* * * * *

UNITED STATES PATENT AND TRADEMARK OFFICE
CERTIFICATE OF CORRECTION

PATENT NO. : 8,185,428 B1
APPLICATION NO. : 12/502706
DATED : May 22, 2012
INVENTOR(S) : Michael J. Campo et al.

It is certified that error appears in the above-identified patent and that said Letters Patent is hereby corrected as shown below:

In column 8, line 57, "HOP" should be replaced with --IIOP--.

In claim 15, column 16, line 52, "user" should be omitted.

Signed and Sealed this
Tenth Day of July, 2012

David J. Kappos
*Director of the United States Patent and Trademark Office*